(12) United States Patent
Tsukamoto et al.

(10) Patent No.: US 12,389,138 B2
(45) Date of Patent: Aug. 12, 2025

(54) IMAGING DEVICE AND ELECTRONIC APPARATUS

(71) Applicant: Sony Semiconductor Solutions Corporation, Kanagawa (JP)

(72) Inventors: Kouzi Tsukamoto, Fukuoka (JP); Hideki Tanaka, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 221 days.

(21) Appl. No.: 18/260,706

(22) PCT Filed: Jan. 5, 2022

(86) PCT No.: PCT/JP2022/000111
§ 371 (c)(1),
(2) Date: Jul. 7, 2023

(87) PCT Pub. No.: WO2022/153901
PCT Pub. Date: Jul. 21, 2022

(65) Prior Publication Data
US 2024/0064430 A1 Feb. 22, 2024

(30) Foreign Application Priority Data
Jan. 14, 2021 (JP) ................. 2021-004332

(51) Int. Cl.
*H04N 25/772* (2023.01)
*H04N 25/77* (2023.01)
*H04N 25/78* (2023.01)
(52) U.S. Cl.
CPC .......... *H04N 25/772* (2023.01); *H04N 25/77* (2023.01); *H04N 25/78* (2023.01)

(58) Field of Classification Search
CPC ....... H04N 25/772; H04N 25/77; H04N 25/78
See application file for complete search history.

(56) References Cited

U.S. PATENT DOCUMENTS 10,887,538 B2 * 1/2021 Zhu ...................... H04N 25/633
2011/0043676 A1   2/2011 Lim
(Continued)

FOREIGN PATENT DOCUMENTS

| JP | 2005323331 A | 11/2005 |
| JP | 2018074268 A | 5/2018 |
| WO | 2020053921 A1 | 3/2020 |

OTHER PUBLICATIONS

International Search Report (PCT/ISA/210), International Application No. PCT/JP2022/000111, dated Mar. 8, 2022.

*Primary Examiner* — Nicholas G Giles
(74) *Attorney, Agent, or Firm* — Michael Best & Friedrich LLP

(57) ABSTRACT

The present disclosure provides an imaging device and an electronic apparatus that can be made smaller in size, are capable of high-speed reading, and do not cause degradation of a captured image.
The imaging device includes: a pixel that outputs a photoelectric conversion signal corresponding to an incident light quantity; and a comparator that compares the photoelectric conversion signal with a reference signal. The comparator includes: a differential circuit that outputs a signal corresponding to a signal difference between the photoelectric conversion signal and the reference signal; and a differential control circuit that sets an operating point of the differential circuit within a signal reset period before an operation of comparing the photoelectric conversion signal with the reference signal is started.

20 Claims, 15 Drawing Sheets

(56) References Cited

U.S. PATENT DOCUMENTS

| | | |
|---|---|---|
| 2018/0288346 A1 | 10/2018 | Yoshida |
| 2019/0052824 A1 | 2/2019 | Yoshida |
| 2019/0289240 A1* | 9/2019 | Zhu ..................... H04N 25/616 |

* cited by examiner

IMAGING DEVICE AND ELECTRONIC APPARATUS

TECHNICAL FIELD

The present disclosure relates to an imaging device and an electronic apparatus.

BACKGROUND ART

There is a known column-AD imaging device that performs column-by-column AD conversion on pixel signals photoelectrically converted in a plurality of pixels arranged in the column direction. In the column-AD imaging device, after a photoelectric conversion signal photoelectrically converted by a photodiode is transferred to a floating diffusion (hereinafter referred to as FD), the photoelectric conversion signal is normally converted into a voltage signal at a source follower circuit, and is input to an AD converter through a signal line extending in the column direction.

However, since the source follower circuit requires a long settling time, the voltage level of the signal line takes a long time to stabilize, and it is difficult to perform high-speed reading.

To perform high-speed reading, a method for reading a photoelectric conversion signal and performing AD conversion without the use of a source follower circuit has been suggested (see Patent Document 1).

CITATION LIST

Patent Document

Patent Document 1: US Patent Publication US2011/0043676 A1

SUMMARY OF THE INVENTION

Problems to be Solved by the Invention

By the method according to Patent Document 1, a transistor that amplifies a photoelectric conversion signal transferred to an FD and another transistor to which a ramp wave voltage is input constitute a differential circuit, and conversion into a voltage signal is performed on the basis of a signal corresponding to a difference between the currents flowing in these transistors.

However, the transistor characteristics in the pixel and the voltage level of the FD vary with each pixel. Because of this, when a voltage signal is generated at the differential circuit described above, its voltage level fluctuates, and a captured image might be degraded.

Therefore, the present disclosure is to provide an imaging device and an electronic apparatus that can be made smaller in size to consume less power, are capable of high-speed reading, and do not cause degradation of a captured image.

Solutions to Problems

To solve the above problem, the present disclosure provides an imaging device that includes: a pixel that outputs a photoelectric conversion signal corresponding to an incident light quantity; and a comparator that compares the photoelectric conversion signal with a reference signal, the comparator including:

a differential circuit that outputs a signal corresponding to a signal difference between the photoelectric conversion signal and the reference signal; and a differential control circuit that sets an operating point of the differential circuit within a signal reset period before an operation of comparing the photoelectric conversion signal with the reference signal is started.

The comparator may include a first current source connected to the differential circuit, the pixel may include a first transistor that generates a current corresponding to the photoelectric conversion signal, the differential circuit may include a second transistor that generates a current corresponding to the reference signal, the differential circuit may output a signal corresponding to a difference between the current flowing in the first transistor and the current flowing in the second transistor, and the first current source may generate and apply a current obtained by adding the current flowing in the first transistor and the current flowing in the second transistor.

The differential circuit may include a third transistor that is cascode-connected to the first transistor, and is turned on when the pixel to be read is read, and the first current source may generate and apply a current obtained by adding the current flowing in the first transistor and the third transistor, and the current flowing in the second transistor.

The differential control circuit may include a second current source and a third current source that are connected in series between a first reference voltage node and a second reference voltage node, the second current source may include a fourth transistor and a fifth transistor that are cascode-connected between the first reference voltage node and an input node of the third current source, and a connection node between the fourth transistor and the fifth transistor may be connected to the second transistor.

The differential control circuit may include an output node that outputs the signal corresponding to the signal difference, from a connection node between the second current source and the third current source, and the differential control circuit may perform negative feedback control on the voltage level of the output node within the signal reset period.

The comparator may include a sixth transistor that switches whether or not to short-circuit the gate of the second transistor and the output node, and the sixth transistor may be turned on within the signal reset period, to short-circuit the gate of the second transistor and the output node.

A capacitor that is connected between the gate of the second transistor and an input node of the reference signal may be further provided, and the input node of the reference signal may be set at a predetermined voltage level while the sixth transistor is on.

The gate voltages of the fourth transistor and the fifth transistor may be adjusted, to set the voltage level of the output node at a predetermined voltage level within the signal reset period.

The voltage levels of the gate voltages of the fourth transistor and the fifth transistor may be maintained after the operating point is set.

The gate voltages of the fourth transistor and the fifth transistor may be set at a voltage level at which the fourth transistor and the fifth transistor operate in a saturated state.

Each of the fourth transistor and the fifth transistor may be a P-type MOS transistor, and
the gate of the fifth transistor may be set at a lower voltage level than the voltage level of the gate of the fourth transistor.

A seventh transistor and an eighth transistor that are cascode-connected between the first reference voltage node and the second reference voltage node may be further provided,
a predetermined bias signal may be supplied to the gate of the seventh transistor, and
the output node may be connected to the gate of the eighth transistor.

A ninth transistor that is connected in parallel to the fourth transistor, and is cascode-connected to the second transistor may be further provided.

When the gate voltage of the first transistor drops, the gate voltage of the ninth transistor may be adjusted, to apply the same current as the current flowing before the drop in the gate voltage of the first transistor to the first current source.

A tenth transistor that is connected in parallel to the second transistor may be further provided, and
the output node may be connected to the gate of the tenth transistor.

The differential circuit may compare the sum of the currents flowing in a plurality of the first transistors provided in a plurality of the pixels with the current flowing in the second transistor, and output the signal corresponding to the signal difference.

A selector that selects at least one first transistor of a plurality of the first transistors provided in a plurality of the pixels may be further provided, and
the differential circuit may compare the sum of the currents flowing in the at least one first transistor selected by the selector with the current flowing in the second transistor, and output the signal according to the signal difference.

The imaging device may further include:
a first substrate in which a plurality of the pixels is disposed; and
a second substrate that is stacked on the first substrate, the comparator being disposed in the second substrate.

An imaging device may include:
a pixel including a photoelectric conversion element and an amplification transistor;
a differential circuit that is formed with the amplification transistor, a first transistor that receives a reference signal, and a first current source;
a second current source and a third current source that are connected in series between a first reference voltage node and a second reference voltage node; and
a second transistor disposed between the second current source and the third current source,
in which a node between the second current source and the second transistor may be connected to the first transistor.

The present disclosure provides an electronic apparatus that includes:
a solid-state imaging device that outputs an imaging pixel signal subjected to photoelectric conversion in a plurality of pixels; and
a signal processing device that performs signal processing on the basis of the imaging pixel signal,
in which the solid-state imaging device includes
a comparator that compares a photoelectric conversion signal with a reference signal, and
the comparator includes:
a differential circuit that outputs a signal corresponding to a signal difference between the photoelectric conversion signal and the reference signal; and
a differential control circuit that sets an operating point of the differential circuit within a signal reset period before an operation of comparing the photoelectric conversion signal with the reference signal is started.

MODES FOR CARRYING OUT THE INVENTION

The following is a description of embodiments of an imaging device and an electronic apparatus, with reference to the drawings. Although principal components of the imaging device and the electronic apparatus will be mainly described below, the imaging device and the electronic apparatus may include components and functions that are not illustrated or described. The following description does not exclude components and functions that are not illustrated or described.

<Example Configuration of an Imaging Device>

Figure 1:
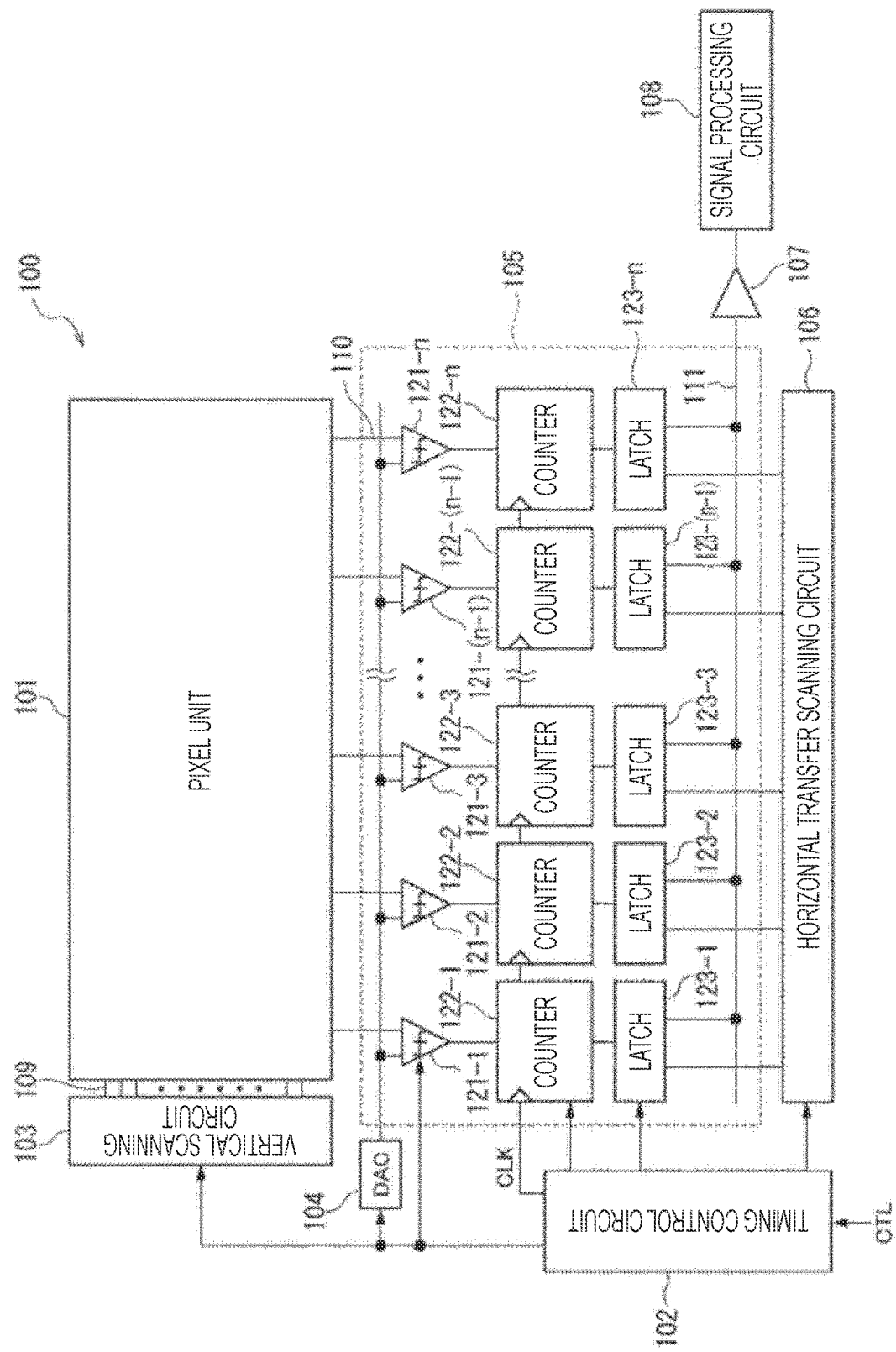
FIG. 1 is a block diagram showing an embodiment of an imaging device to which the present technology is applied.

FIG. 1 is a block diagram showing an embodiment of an imaging device 100 to which the present technology is applied.

The imaging device 100 includes a pixel unit 101, a timing control circuit 102, a vertical scanning circuit 103, a digital-analog converter (DAC) 104, an analog-digital converter (ADC) group 105, a horizontal transfer scanning circuit 106, an amplifier circuit 107, and a signal processing circuit 108.

Unit pixels (hereinafter also simply referred to as pixels) each including a photoelectric conversion element that photoelectrically converts incident light into a charge amount corresponding to the light quantity thereof are arranged in a matrix in the pixel unit 101. A specific circuit configuration of the unit pixels will be described later with reference to FIG. 2. Also, in the pixel unit 101, for the pixel array in the matrix, a pixel drive line 109 is disposed in the transverse direction in the drawing (the pixel array direction of the pixel row/a horizontal direction) for each row, and a vertical signal line 110 is disposed in the vertical direction of the drawing (the pixel array direction of the pixel column/a perpendicular direction) for each column. One end of each pixel drive line 109 is connected to the output terminal corresponding to each corresponding row of the vertical scanning circuit 103. Note that, in FIG. 1, one pixel drive line 109 is shown for each pixel row. However, two or more pixel drive lines 109 may be provided for each pixel row.

The timing control circuit 102 includes a timing generator (not shown) that generates various kinds of timing signals. The timing control circuit 102 performs drive control on the vertical scanning circuit 103, the DAC 104104, the ADC group 105, the horizontal transfer scanning circuit 106, and the like, on the basis of various timing signals generated by the timing generator on the basis of a control signal or the like provided from the outside.

The vertical scanning circuit 103 is formed with a shift register, an address decoder, and the like. Although a specific configuration is not shown in this drawing, the vertical scanning circuit 103 includes a reading scanning system and a sweeping scanning system.

The reading scanning system sequentially performs selective scanning row by row for unit pixels from which signals are to be read. Meanwhile, the sweeping scanning system performs, on the read rows on which reading scanning is to be performed by the reading scanning system, sweeping scanning to sweep (reset) unnecessary charges from the photoelectric conversion elements of the unit pixels in the read rows prior to the reading scanning by the time corresponding to the shutter speed. A so-called electronic shutter operation is performed by the sweeping scanning system sweeping (resetting) the unnecessary charges. Here, the electronic shutter operation means an operation of discarding the optical charges of the photoelectric conversion elements and newly starting exposure (starting accumulating optical charges). The signals read in the reading operation performed by the reading scanning system corresponds to the amount of light that has entered after the immediately preceding reading operation or the electronic shutter operation. Further, the period from the reading timing in the immediately preceding reading operation or the sweeping timing in the electronic shutter operation to the reading timing in the current reading operation is the optical charge accumulation duration (exposure duration) in the unit pixel.

A pixel signal VSL that is output from each unit pixel of the pixel row selectively scanned by the vertical scanning circuit 103 is supplied to the ADC group 105 via the vertical signal line 110 of each column.

The DAC 104 generates a reference signal RAMP that is a signal of a linearly increasing ramp waveform, and supplies the reference signal RAMP to the ADC group 105.

The ADC group 105 includes comparators 121-1 to 121-n, counters 122-1 to 122-n, and latches 123-1 to 123-n. Note that, hereinafter, in a case where there is no need to distinguish the comparators 121-1 to 121-n from one another, the counters 122-1 to 122-n from one another, and the latches 123-1 to 123-n from one another, they will be referred to simply as the comparators 121, the counters 122, and the latches 123.

One comparator 121, one counter 122, and one latch 123 are provided for each column in the pixel unit 101, to constitute an ADC. That is, the ADC group 105 is provided with an ADC for each column in the pixel unit 101.

Each comparator 121 compares the pixel signal VSL output from each corresponding pixel with the reference signal RAMP, and supplies an output signal indicating a comparison result to the corresponding counter 122.

The counter 122 counts the duration until the signal obtained by adding the pixel signal VSL and the reference signal RAMP via a capacitance exceeds a predetermined reference voltage on the basis of the output signal of the comparator 121, to convert the analog pixel signal into a digital pixel signal represented by a count value. The counter 122 supplies the count value to the latch 123.

The latch 123 holds the count value supplied from the counter 122. The latch 123 also performs correlated double sampling (CDS) by calculating a difference between the count value of the D-phase corresponding to the pixel signal at a signal level and the count value of the P-phase corresponding to the pixel signal at a reset level.

The horizontal transfer scanning circuit 106 is formed with a shift register, an address decoder, and the like, and sequentially and selectively scans circuit portions corresponding to the pixel columns in the ADC group 105. As the horizontal transfer scanning circuit 106 performs the selective scanning, the digital pixel signals held in the latches 123 are sequentially transferred to the amplifier circuit 107 via a horizontal transfer line 111.

The amplifier circuit 107 amplifies the digital pixel signals supplied from the latches 123, and supplies the amplified digital pixel signals to the signal processing circuit 108.

The signal processing circuit 108 performs predetermined signal processing on the digital pixel signals supplied from the amplifier circuit 107, to generate two-dimensional image data. For example, the signal processing circuit 108 corrects a vertical line defect or a point defect, clamps signals, or performs digital signal processing such as parallel-serial conversion, compression, encoding, adding, averaging, and intermittent operation. The signal processing circuit 108 outputs the generated image data to a device in the subsequent stage.

<Example Configuration of a Pixel>

Figure 2:
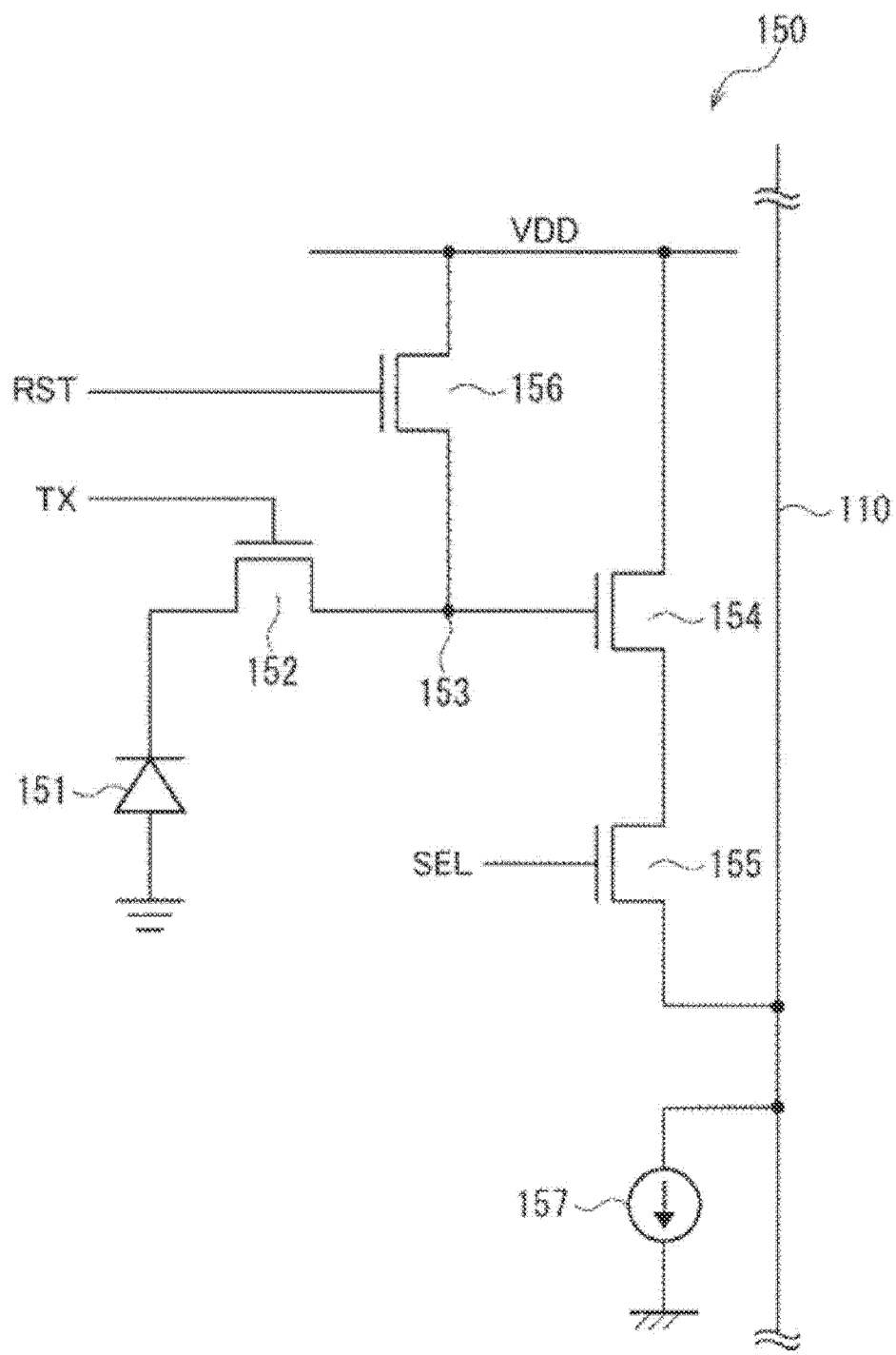
FIG. 2 is a circuit diagram showing an example internal configuration of a pixel provided in a pixel unit.

FIG. 2 is a circuit diagram showing an example internal configuration of a pixel 150 provided in the pixel unit 101.

The pixel 150 includes a photoelectric conversion element and a readout circuit. The photoelectric conversion element includes a photodiode 151, for example. The readout circuit includes a transfer transistor 152, an amplification transistor 154, a select transistor 155, and a reset transistor 156, for example. FIG. 2 shows an example in which these transistors are formed with N-type MOS transistors.

The photodiode 151 photoelectrically converts incident light into charges (electrons in this case) of the amount corresponding to the quantity of the incident light.

The transfer transistor 152 is connected between the photodiode 151 and a floating diffusion (FD) 153. When turned on by a drive signal TX supplied from the vertical scanning circuit 103, the transfer transistor 152 transfers the charge accumulated in the photodiode 151 to the FD 153.

A gate of the amplification transistor 154 is connected to the FD 153. The amplification transistor 154 is connected to the vertical signal line 110 via the select transistor 155, and constitutes, together with a current source 157 outside the pixel unit 101, a source follower circuit. When the select transistor 155 is turned on by a drive signal SEL supplied from the vertical scanning circuit 103, the amplification transistor 154 amplifies the potential of the FD 153, and outputs a pixel signal indicating the voltage corresponding to the potential, to the vertical signal line 110. The pixel signal output from each pixel 150 is then supplied to each corresponding comparator 121 of the ADC group 105 via the vertical signal line 110.

In this embodiment, as the amplification transistor 154 and the select transistor 155 are used as part of the comparator 121 as described later, the current source 157 and the source follower circuit are made unnecessary.

The reset transistor 156 is connected between a power supply VDD and the FD 153. When the reset transistor 156 is turned on by a drive signal RST supplied from the vertical scanning circuit 103, the potential of the FD 153 is reset to the potential of the power supply VDD.

<Example Configuration of a Comparator>

Figure 3:
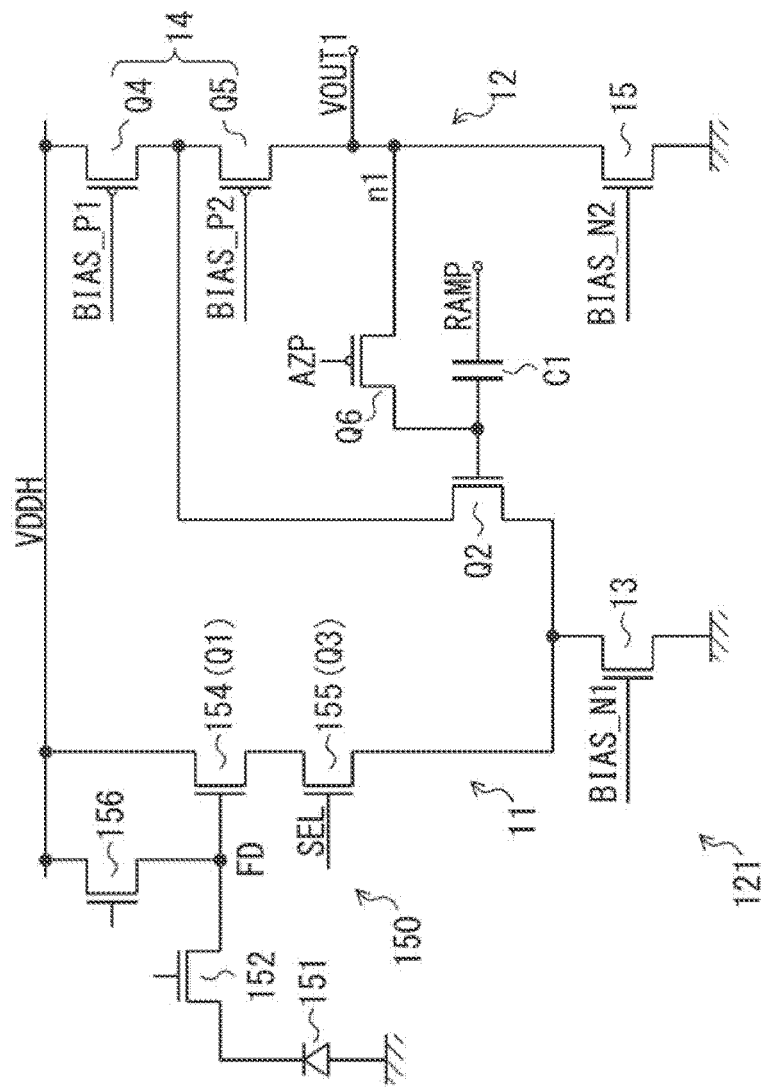
FIG. 3 is a circuit diagram showing an example internal configuration of each comparator shown in FIG. 1.

FIG. 3 is a circuit diagram showing an example internal configuration of each comparator 121 shown in FIG. 1. The comparator 121 in FIG. 3 includes a differential circuit 11 and a differential control circuit 12.

The differential circuit 11 outputs a signal corresponding to a signal difference between a photoelectric conversion signal and a reference signal. The photoelectric conversion signal is a signal obtained by the amplification transistor 154 amplifying the potential of the FD 153. The circuit configuration of differential circuit 11 will be described later in detail.

The differential control circuit 12 sets an operating point of the differential circuit 11 within a signal reset period before an operation of comparing the photoelectric conversion signal with the reference signal is started.

The differential circuit 11 outputs a signal corresponding to a difference between the currents flowing in a first transistor Q1 and a second transistor Q2 that constitute a differential pair. The first transistor Q1 is the amplification transistor 154 in the pixel 150. In the normal pixel 150, as shown in FIG. 2, the select transistor (a third transistor Q3) 155 is cascode-connected to the amplification transistor 154. Accordingly, the differential circuit 11 outputs a signal corresponding to a difference between the current flowing in the first transistor Q1 and the third transistor Q3, and the current flowing in the second transistor Q2. The reference signal is supplied to the gate of the second transistor Q2 via a capacitor C1.

As described above, the differential circuit 11 according to this embodiment compares the current flowing in the amplification transistor 154 and the select transistor 155 in the pixel 150, directly with the current flowing in the second transistor Q2 to which the reference signal is supplied at the gate. As a result, the dynamic range can be made wider, and reading can be performed at higher speed than in a case where the current flowing in the first transistor Q1 is converted into a voltage signal by the source follower circuit and is then compared with the reference signal. This effect will be described later in detail.

The comparator 121 in FIG. 3 includes a first current source 13 connected to the differential circuit 11. A current obtained by adding the current flowing in the first transistor Q1 and the current flowing in the second transistor Q2 flows in the first current source 13. The first current source 13 includes an N-type MOS transistor, for example. A bias signal BIAS_N1 is supplied to the gate of this transistor. The voltage of the bias signal BIAS_N1 is controlled, so that the total amount of current flowing in the first transistor Q1 and the second transistor Q2 in the differential circuit 11 can be adjusted.

The differential control circuit 12 includes a second current source 14 and a third current source 15 connected in series between a power-supply voltage node (a first reference voltage node) VDDH and a ground node (a second reference voltage node). The second current source 14 includes a fourth transistor Q4 and a fifth transistor Q5 cascode-connected between the power-supply voltage node VDDH and an output node n1 of the comparator 121. The fourth transistor Q4 and the fifth transistor Q5 are P-type MOS transistors, for example. A bias signal BIAS_P1 is supplied to the gate of the fourth transistor Q4, and a bias signal BIAS_P2 is supplied to the gate of the fifth transistor Q5.

The connection node between the fourth transistor Q4 and the fifth transistor Q5 is connected to the drain of the second transistor Q2. The current flowing in the second current source 14 is determined with the characteristics of the pixel 150, variations of the respective transistors in the pixel 150, and the like being taken into consideration. In this embodiment, at a time of signal resetting, the signal voltage of the output node n1 of the comparator 121 is subjected to negative feedback control, and the bias signals BIAS_P1 and BIAS_P2 of the fourth transistor Q4 and the fifth transistor Q5 are adjusted so that the output node n1 of the comparator 121 is set at a desired voltage level.

Further, the bias signals BIAS_P1 and BIAS_P2 are set at voltage levels at which the fourth transistor Q4 and the fifth transistor Q5 operate in a saturated state. The method for setting the bias signals BIAS_P1 and BIAS_P2 will be described later.

In FIG. 3, the connection node n1 between the second current source 14 and the third current source 15 is the output node n1 of the comparator 121, but a circuit for increasing the gain may be connected to the connection node n1 between the second current source 14 and the third current source 15, and the connection node n1 may not be the output node n1 of the comparator 121 in some cases. Note that, in this specification, the connection node between the second current source 14 and the third current is sometimes referred to as the output node n1 of the comparator 121.

The third current source 15 includes an N-type MOS transistor, for example. This transistor is connected between the output node n1 of the comparator 121 and the ground node. A bias signal BIAS_N2 is supplied to the gate of this transistor.

The comparator 121 includes a sixth transistor Q6 that switches whether or not to short-circuit the gate of the second transistor Q2 and the output node n1 of the comparator 121. The sixth transistor Q6 is a P-type MOS transistor, for example. An AZP signal is supplied to the gate of the sixth transistor Q6. The AZP signal temporarily switches to a low potential at the time of signal resetting. When the AZP signal switches to the low potential, the sixth transistor Q6 is turned on, and the gate of the second transistor Q2 and the output node n1 of the comparator 121 are short-circuited. When the sixth transistor Q6 is turned on, the operation of setting the operating point of the differential circuit 11 is performed.

The comparator 121 according to this embodiment performs an operation (a P-phase operation) of comparing the signal with the reference signal at the time of signal resetting that does not involve photoelectric conversion, and then performs an operation (a D-phase operation) of comparing the photoelectric conversion signal with the reference signal.

Figure 4:
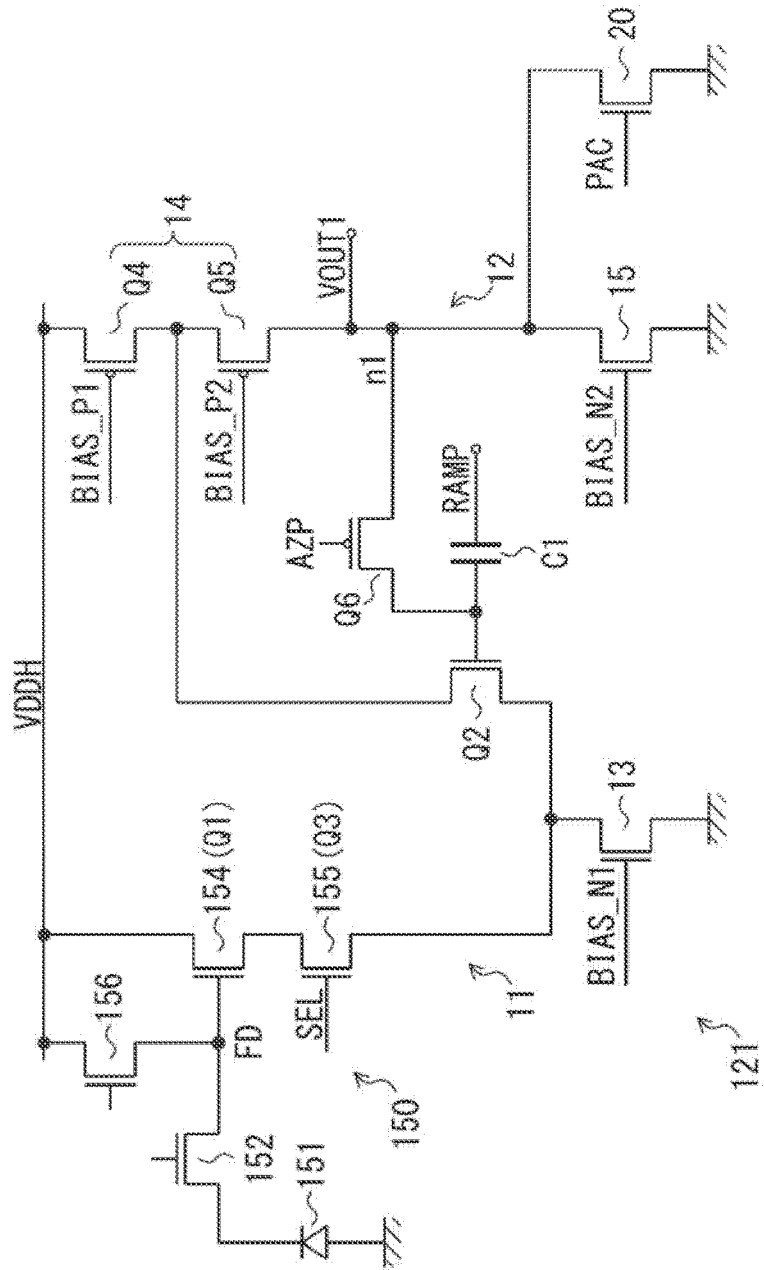
FIG. 4 is a circuit diagram of a comparator that further includes an initialization circuit for initializing the voltage level of the output node n1 shown in FIG. 3.

FIG. 4 is a circuit diagram of a comparator 121 that further includes an initialization circuit 20 for initializing the voltage level of the output node n1 in FIG. 3. The initialization circuit 20 in FIG. 4 includes an N-type MOS transistor, for example, and an initialization signal PAC is supplied to the gate of this transistor. When the initialization signal PAC switches to a high logic, the initialization circuit 20 sets the voltage VOU1 of the output node n1 to an initialization potential.

Figure 5:
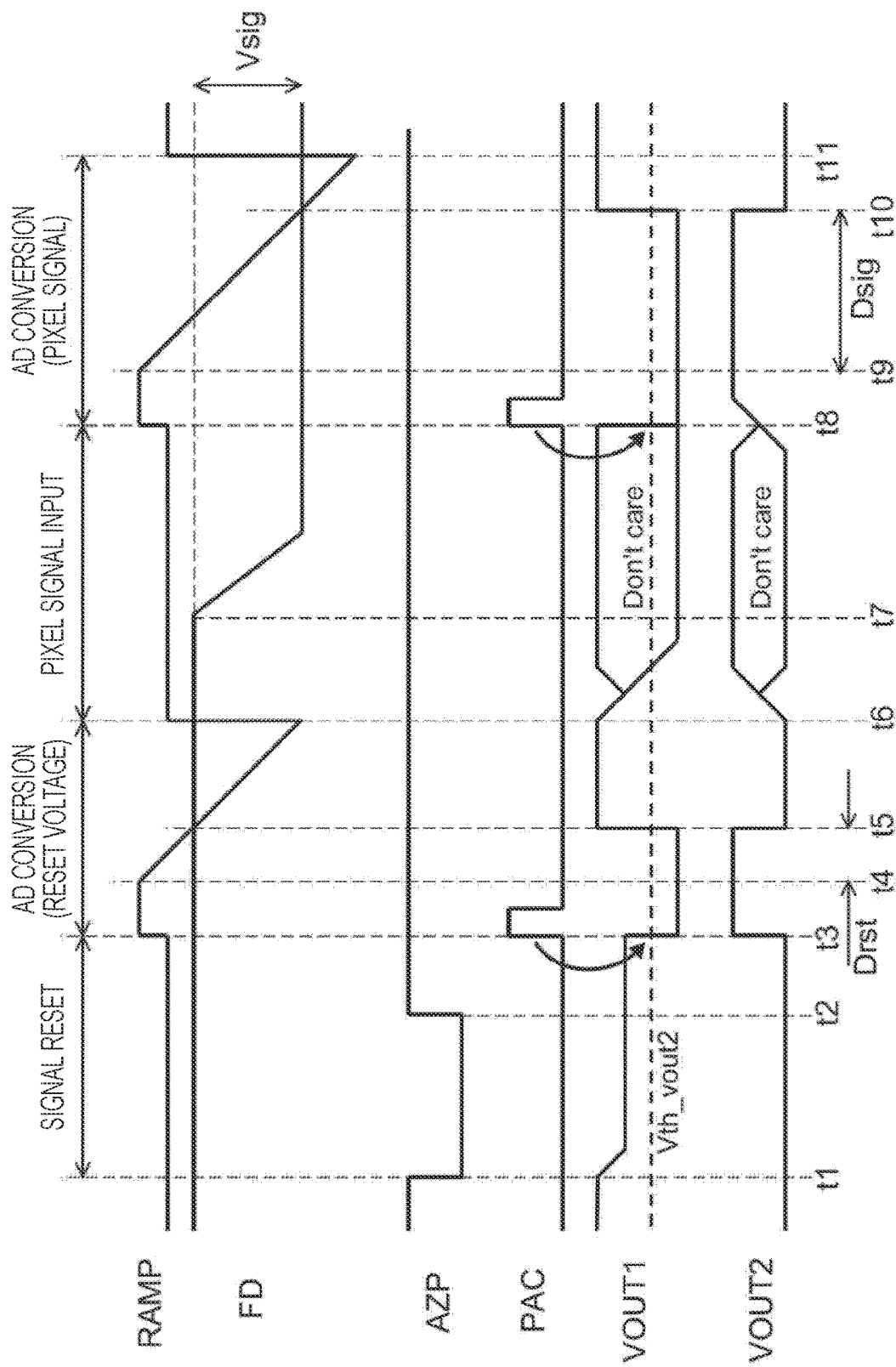
FIG. 5 is an operation timing diagram of the comparator shown in FIG. 3.

FIG. 5 is an operation timing diagram of the comparators 121 shown in FIGS. 3 and 4. In the description below, operations of the comparators 121 shown in FIGS. 3 and 4 are explained with reference to FIG. 5. First, the period from time t1 to time t3 is a signal reset period. During this period, the DAC 104 outputs a reference signal of a predetermined voltage level. Further, as shown in FIG. 2, during the signal reset period, the reset transistor in the pixel 150 is turned off after being turned on, and the FD 153 is fixed to a reset potential.

The AZP signal switches to the low potential within the period from time t1 to time t2. As a result, the sixth transistor Q6 is turned on, and the gate of the second transistor Q2 has the same potential as the output node n1 of the comparator 121. The operating point of the differential circuit 11 is set within the period from time t1 to time t2. More specifically, the bias signals BIAS_P1 and BIAS_P2 of the fourth transistor Q4 and the fifth transistor Q5 are adjusted so that the output node n1 of the comparator 121 is set at a predetermined voltage level. In this manner, negative feedback control is performed. At this stage, the bias signals BIAS_P1 and BIAS_P2 are adjusted so that the fourth transistor Q4 and the fifth transistor Q5 operate in the saturation region. As a result, the operating point of the differential circuit 11 is set. The voltage levels of the bias signals BIAS_P1 and BIAS_P2 corresponding to the set operating point are held in a capacitance (not illustrated). After time t2, the comparator 121 performs an operation of comparing the photoelectric conversion signal with the reference signal. However, while the comparator 121 is performing the comparison operation, the bias signals BIAS_P1 and BIAS_P2 are held at the voltage levels set within the period from time t1 to time t2.

When the AZP signal switches to the high level at time t2, the sixth transistor Q6 is turned off. Accordingly, after time t2, the gate voltage of the second transistor Q2 turns into a voltage that changes with the voltage level of the reference signal.

At time t3, the initialization signal PAC switches to a high logic, and the voltage VOU1 of the output node n1 drops to the initialization potential. Further, the DAC 104 raises the reference signal to the initial voltage level, and maintains the voltage level until time t4. As a result, the current flowing in the second transistor Q2 becomes larger than the current flowing in the first transistor Q1 in the differential circuit 11, and the voltage of the output node n1 of the comparator 121 drops.

The DAC 104 lowers the voltage level of the reference signal continuously or stepwise during the period from time t4 to time t6. Between time t4 and time t6, the pixel 150 has not yet performed photoelectric conversion, and the FD 153 maintains the reset potential. During the period from time t4 to time t5, the voltage level of the reference signal is higher than the reset potential of the FD 153. Accordingly, the current flowing in the second transistor Q2 is larger than the current flowing in the first transistor Q1 in the differential circuit 11, and the output node n1 of the comparator 121 maintains the low potential. As the voltage level of the reference signal crosses the reset potential at time t5, the current flowing in the first transistor Q1 in the differential circuit 11 is larger than the current flowing in the second transistor Q2 after time t5. As a result, the output node n1 of the comparator 121 transitions from the low potential to the high potential.

The counter 122 counts the duration from time t4 at which the voltage level of the reference signal starts dropping till time t5 at which the reference signal and the potential of the FD 153 cross, and the count value of the counter 122 is held by the latch 123. The count value held by the latch 123 is a P-phase count value.

After that, during the period from time t6 to time t7, when the transfer transistor 152 shown in FIG. 2 is turned on by the electric charge photoelectrically converted by the photodiode 151, the FD 153 is lowered to the potential corresponding to the quantity of incident light. After raising the reference signal to the initial voltage level during the period from time t8 to time t9, the DAC 104 lowers the voltage level of the reference signal continuously or stepwise during the period from time t9 to time t10. While the voltage level of the reference signal is higher than the voltage level of the FD 153 (from time t9 to time t10), the current does not flow in the first transistor Q1 in the differential circuit 11 but flows in the second transistor Q2. After the voltage level of the reference signal crosses the voltage level of the FD 153 at time t10, the current flows in the first transistor Q1 in the differential circuit 11 but does not flow in the second transistor Q2. As a result, the output node n1 of the comparator 121 has the low potential during the period from time t8 to time t10, and the high potential during the period from time t10 to time t11.

The counter 122 counts the duration from time t9 at which the voltage level of the reference signal starts dropping till time t10 at which the reference signal and the potential of the FD 153 cross, and the count value of the counter 122 is held by the latch 123. The count value held by the latch 123 is a D-phase count value.

The latch 123 performs CDS by calculating a difference between the P-phase count value and the D-phase count value, and generates an AD conversion signal.

Figure 6:
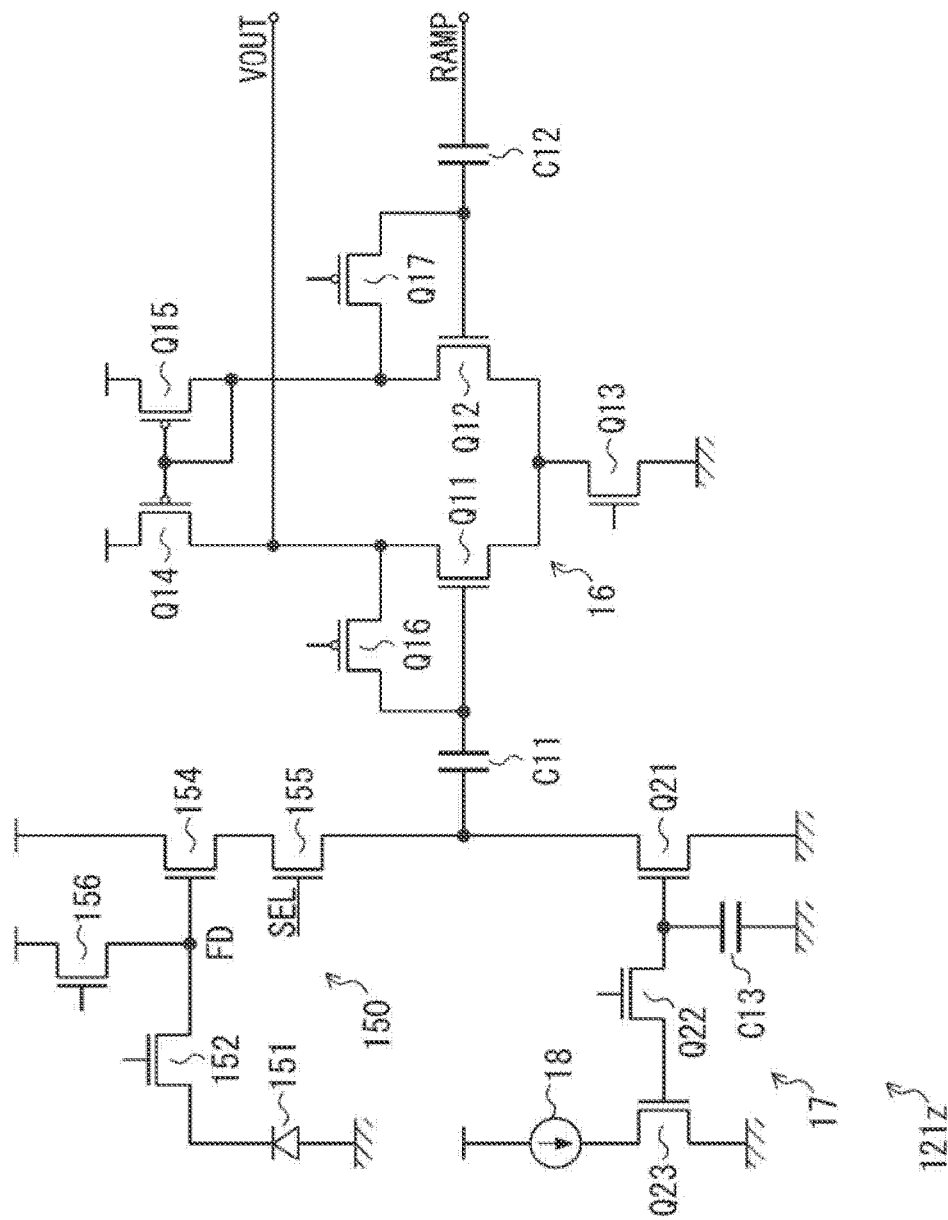
FIG. 6 is a circuit diagram of a comparator according to a comparative example.

FIG. 6 is a circuit diagram of a comparator 121z according to a comparative example. The comparator 121z in FIG. 6 includes a differential amplifier 16 and a current source 17.

The differential amplifier 16 includes transistors Q11 to Q17, and capacitors C11 and C12. The transistors Q11 to Q13 are N-type MOS transistors, and the transistors Q14 to Q17 are P-type MOS transistors. The transistors Q11 and Q12 constitute a differential circuit. The transistor Q13 is a current source connected to each source of the transistors Q11 and Q12. The transistors Q14 and Q15 constitute a current mirror circuit, and are connected to the drains of the transistors Q11 and Q12. The transistor Q16 switches whether or not to short-circuit the gate and the drain of the transistor Q11. The transistor Q17 switches whether or not to short-circuit the gate and the drain of the transistor Q12. The gate of the transistor Q11 is connected to the output node of the pixel 150 and the input node of a current source 18 via the capacitor C11. The reference signal RAMP is input to the gate of the transistor Q12 via the capacitor C12.

The current source 17 includes N-type MOS transistors Q21 to Q23, a capacitor C13, and a constant current source 18. The current source 17 is connected to the select transistor 155 in the pixel 150, and forms a source follower circuit.

The comparator 121z in FIG. 6 has a more complicated circuit configuration than that of the comparator 121 shown in FIG. 3. In particular, the comparator 121z in FIG. 6 includes the transistor Q11 separately from the amplification transistor 154 and the select transistor 155 in the pixel 150, and outputs a signal corresponding to a difference between the current flowing in the transistor Q11 and the current flowing in the transistor Q12 to which the reference signal is input at the gate. The comparator 121z in FIG. 6 also includes the current source 17 connected to the output node of the pixel 150. The amplification transistor 154 and the select transistor 155 in the pixel 150 in FIG. 3 are a source follower circuit, and it takes time to stabilize the potential of the output node of the pixel 150. Therefore, in the comparator 121z in FIG. 6, a comparison operation needs to be performed after the potential of the output node of the pixel 150 is stabilized, and a high-speed operation is difficult. Also, the comparator 121z in FIG. 6 has a more complicated circuit configuration than that of the comparator 121 in FIG. 3. Therefore, the circuit area cannot be reduced, and power consumption increases. Further, in the comparator 121z in FIG. 6, the transistors Q14 and Q15 connected to the power-supply voltage node are P-type MOS transistors, and therefore, the dynamic range is narrow.

As described above, the comparator 121 in FIG. 3 can operate at a higher speed, can be made smaller in size, and can realize lower power consumption, compared with the comparator 121z in FIG. 6. Various modifications can be made to the circuit configuration of the comparator 121 shown in FIG. 3.

(First Modification of the Comparator 121)

Figure 7:
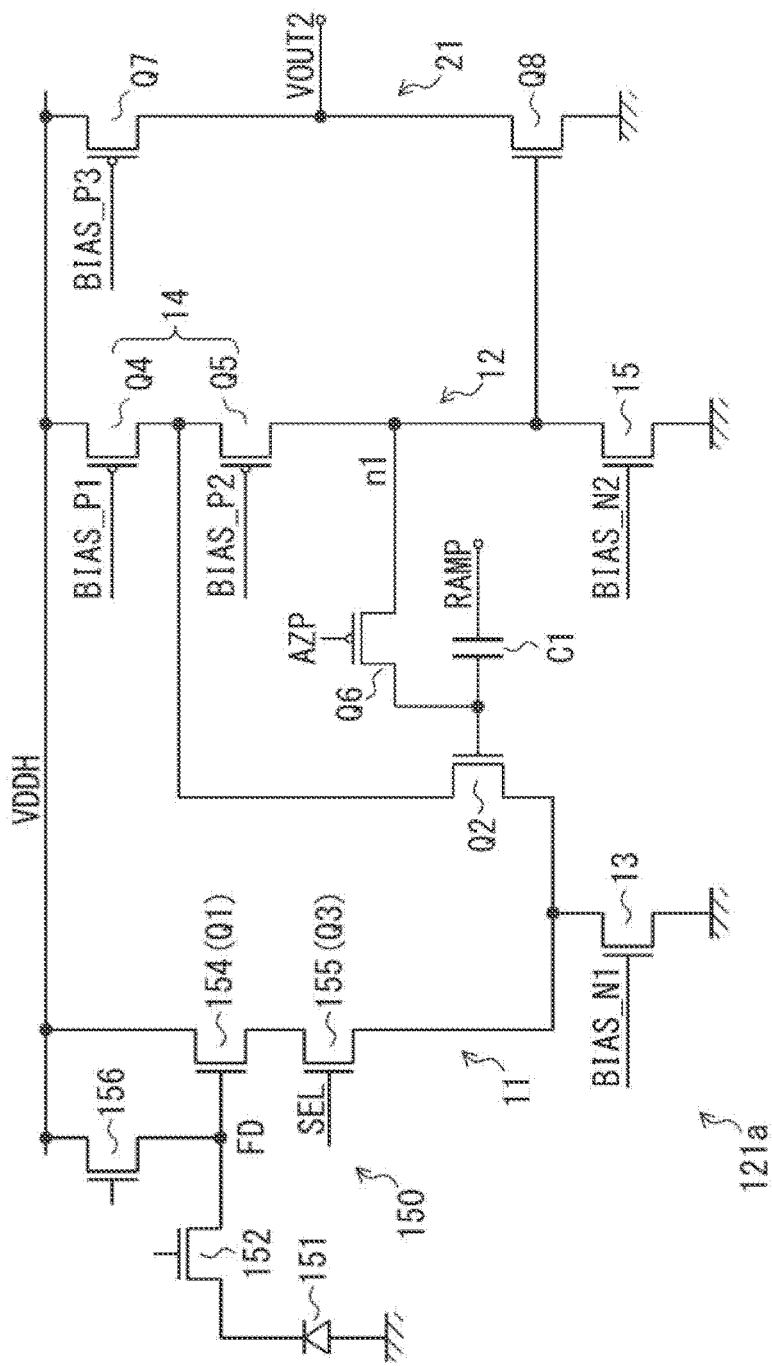
FIG. 7 is a circuit diagram of a first modification of the comparator shown in FIG. 3.

FIG. 7 is a circuit diagram of a first modification of the comparator 121 shown in FIG. 3. A comparator 121a in FIG. 7 includes an output amplifier 21, in addition to the circuit configuration of the comparator 121 shown in FIG. 3. The output amplifier 21 includes a seventh transistor Q7 and an eighth transistor Q8 cascode-connected between the power-supply voltage node VDDH and the ground node, for example. A bias signal BIAS_P3 is supplied to the gate of the seventh transistor Q7, and the drain of the fifth transistor Q5 is connected to the gate of the eighth transistor Q8. The output amplifier 21 is a source-grounded circuit, and can increase the gain of a signal output from the drain of the fifth transistor Q5. As an output voltage VOUT2 of the comparator 121a is input to the counter 122 that is a digital circuit (logic circuit), the signal having the gain increased by the output amplifier 21 is output, so that a signal having an input level allowable for a digital circuit (logic circuit) can be input to the counter 122.

(Second Modification of the Comparator 121)

In a case where an object having a white pattern on a black background or the like is imaged, a captured image including streaks that are white lines appearing in the black background portion might be obtained.

Figure 8:
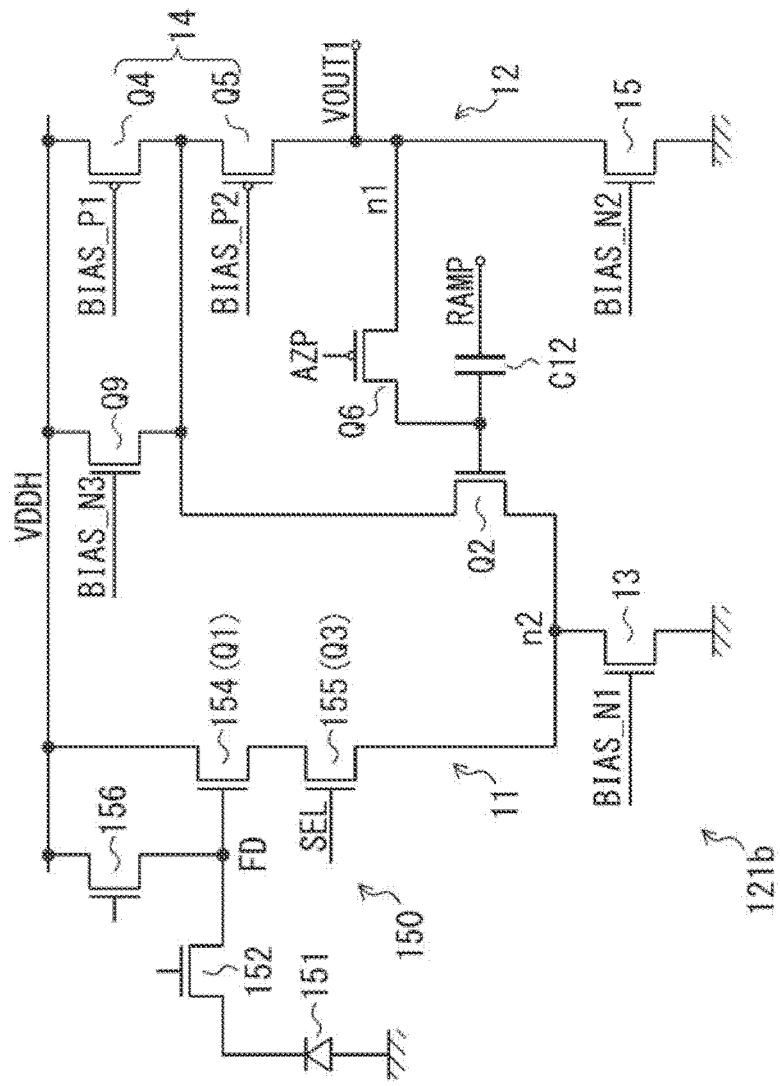
FIG. 8 is a circuit diagram of a second modification of the comparator shown in FIG. 3.

FIG. 8 is a circuit diagram of a second modification of the comparator 121 shown in FIG. 3, and shows a circuit configuration that takes measures against streaks when an object having a white pattern on a black background is imaged.

A comparator 121b in FIG. 8 includes a ninth transistor Q9, in addition to the circuit configuration shown in FIG. 2. The ninth transistor Q9 is an N-type MOS transistor, for example. The ninth transistor Q9 is connected in parallel to the fourth transistor Q4, and is cascode-connected to the second transistor Q2. That is, the ninth transistor Q9 and the second transistor Q2 are cascode-connected between the power-supply voltage node and the input node n2 of the first current source 13. A bias signal BIAS_N3 is supplied to the gate of the ninth transistor Q9.

In a case where a pixel 150 of a high luminance is photoelectrically converted, when D-phase photoelectric conversion is started after signal resetting, the potential of the FD 153 greatly drops, and the current flowing in the first transistor Q1 of the differential circuit 11 in the comparator 121b in FIG. 8 decreases. The differential circuit 11 operates so that the current flowing in the first current source 13 is always constant. Therefore, the current flowing in the second transistor Q2 is increased by the amount equivalent to the decrease in the current flowing in the first transistor Q1. However, since the voltage levels of the bias signals BIAS_P1 and BIAS_P2 to be supplied to the gate voltages of the fourth transistor Q4 and the fifth transistor Q5 are kept constant, the decrease in the current flowing in the first transistor Q1 cannot be compensated for, and streaks appear. Therefore, the ninth transistor Q9 is newly provided so that a current can flow from the power-supply voltage node to the first current source 13 through the ninth transistor Q9. With this arrangement, the current flowing from the power-supply voltage node to the first current source 13 can be made constant at all times, and streaks at the time of imaging of an object having a white pattern on a black background can be prevented from appearing.

(Third Modification of the Comparator 121)

Figure 9:
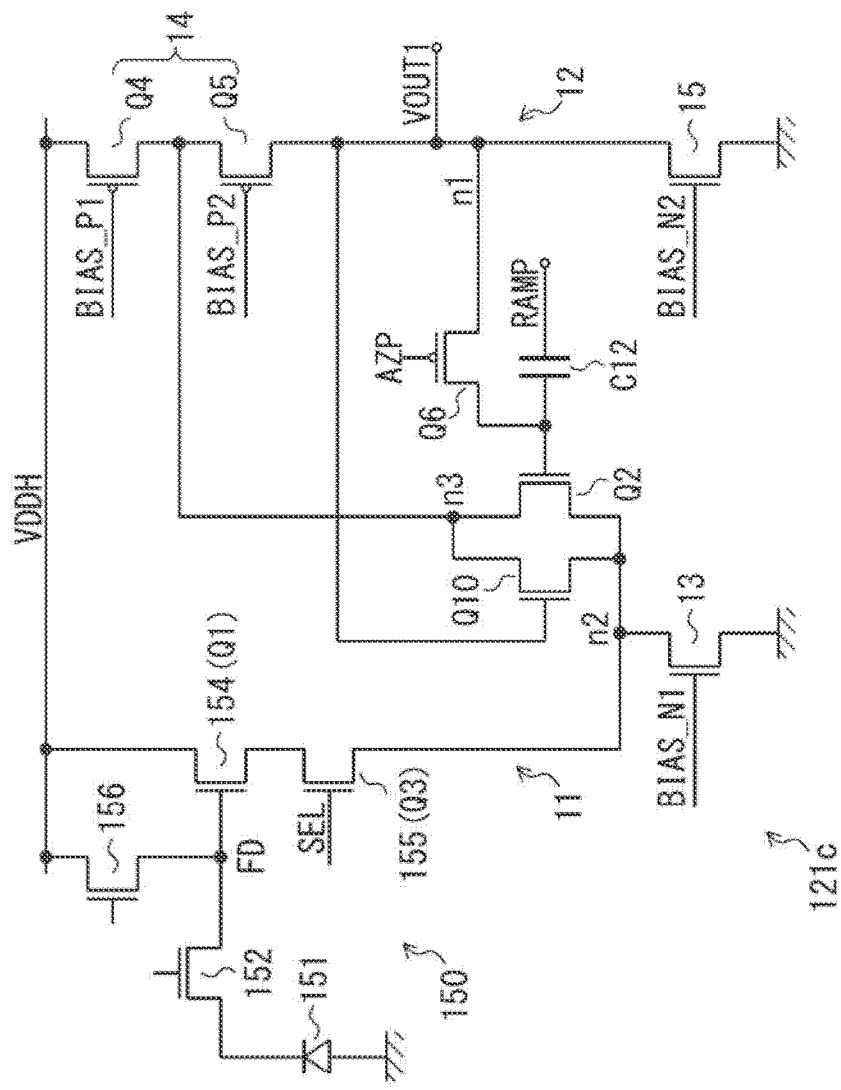
FIG. 9 is a circuit diagram of a third modification of the comparator shown in FIG. 3.

FIG. 9 is a circuit diagram of a third modification of the comparator 121 shown in FIG. 3, and shows a circuit configuration that takes measures against streaks when an object having a black pattern on a white background is imaged.

A comparator 121c in FIG. 9 includes a tenth transistor Q10, in addition to the circuit configuration shown in FIG. 2. The tenth transistor Q10 is connected in parallel to the second transistor Q2. The tenth transistor Q10 is an N-type MOS transistor, for example. The drain of the tenth transistor Q10 is connected to the connection node n3 between the fourth transistor Q4 and the fifth transistor Q5. The source of the tenth transistor Q10 is connected to the input node n2 of the first current source 13. The gate of the tenth transistor Q10 is connected to the output node (or the drain of the fifth transistor Q5) n1 of the comparator 121c.

In a case where the potential of the FD 153 is high at a time when the operation of acquiring a P-phase count value is switched to an operation of acquiring a D-phase count value, a large current flows on the side of the first transistor Q1. The voltage level of the reference signal drops with time. When the voltage level of the reference signal becomes lower than the potential of the FD 153, almost no current flows in the second transistor Q2, and most of the current flows in the first transistor Q1. In this case, the voltage level of the power-supply voltage node on the side of the pixel 150 might cause a voltage drop due to IR (hereinafter referred to as the IR drop).

As the comparator 121c in FIG. 9 includes the tenth transistor Q10 connected in parallel to the second transistor Q2, the decrease in the current flowing in the second transistor Q2 can be compensated for by the tenth transistor Q10, and thus, the current flowing in the first transistor Q1 can be reduced. Accordingly, the IR drop at the power-supply voltage node on the side of the pixel 150 can be prevented, and streaks at a time of imaging of an object having a black pattern on a white background can be prevented from appearing.

(Fourth Modification of the Comparator 121)

Although the ADC according to this embodiment is provided basically for the respective pixel columns in the column direction, it is possible to adopt a modification in which one ADC is provided for each one pixel column in a plurality of pixel columns, a modification in which a plurality of pixels 150 adjacent in the row direction are added up before AD conversion, and the like.

Figure 10:
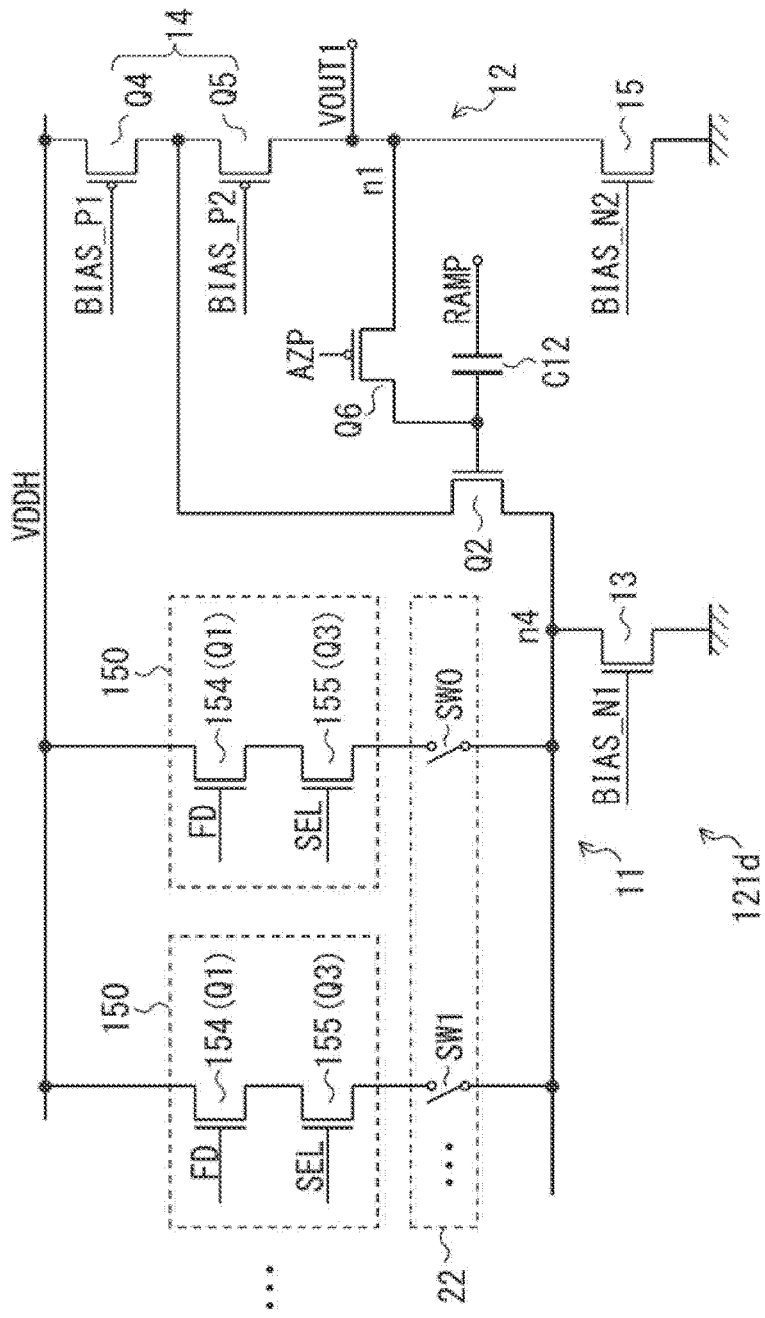
FIG. 10 is a circuit diagram of a fourth modification of the comparator shown in FIG. 3.

FIG. 10 is a circuit diagram of a fourth modification of the comparator 121 shown in FIG. 3. A comparator 121$d$ in FIG. 10 compares at least one photoelectric conversion signal of a plurality of pixels 150 arranged in the row direction with a reference signal. The comparator 121$d$ in FIG. 10 includes a selector 22. The selector 22 is connected between the source of the third transistor Q3 (the select transistor 155) in the differential circuit 11 and the input node of the first current source 13. The selector 22 includes, for each pixel 150, a plurality of switches SW0 and SW1 for switching whether or not to connect the source of the third transistor Q3 in the corresponding pixel 150 to the input node of the first current source 13. With this arrangement, while the photoelectric conversion signal of any one pixel 150 among the plurality of pixels 150 can be compared with the reference signal, the signal obtained by adding the photoelectric conversion signals of any two or more pixels 150 among the plurality of pixels 150 can also be compared with the reference signal.

In FIG. 10, only one pixel 150 is shown in the column direction, but a plurality of pixels 150 may be disposed in the column direction. As the selector 22 is provided as shown in FIG. 10, a smaller number of comparators 121$d$ than the number of pixel columns in the column direction are required to be provided, and the circuit area of the imaging device 100 can be reduced.

Figure 11:
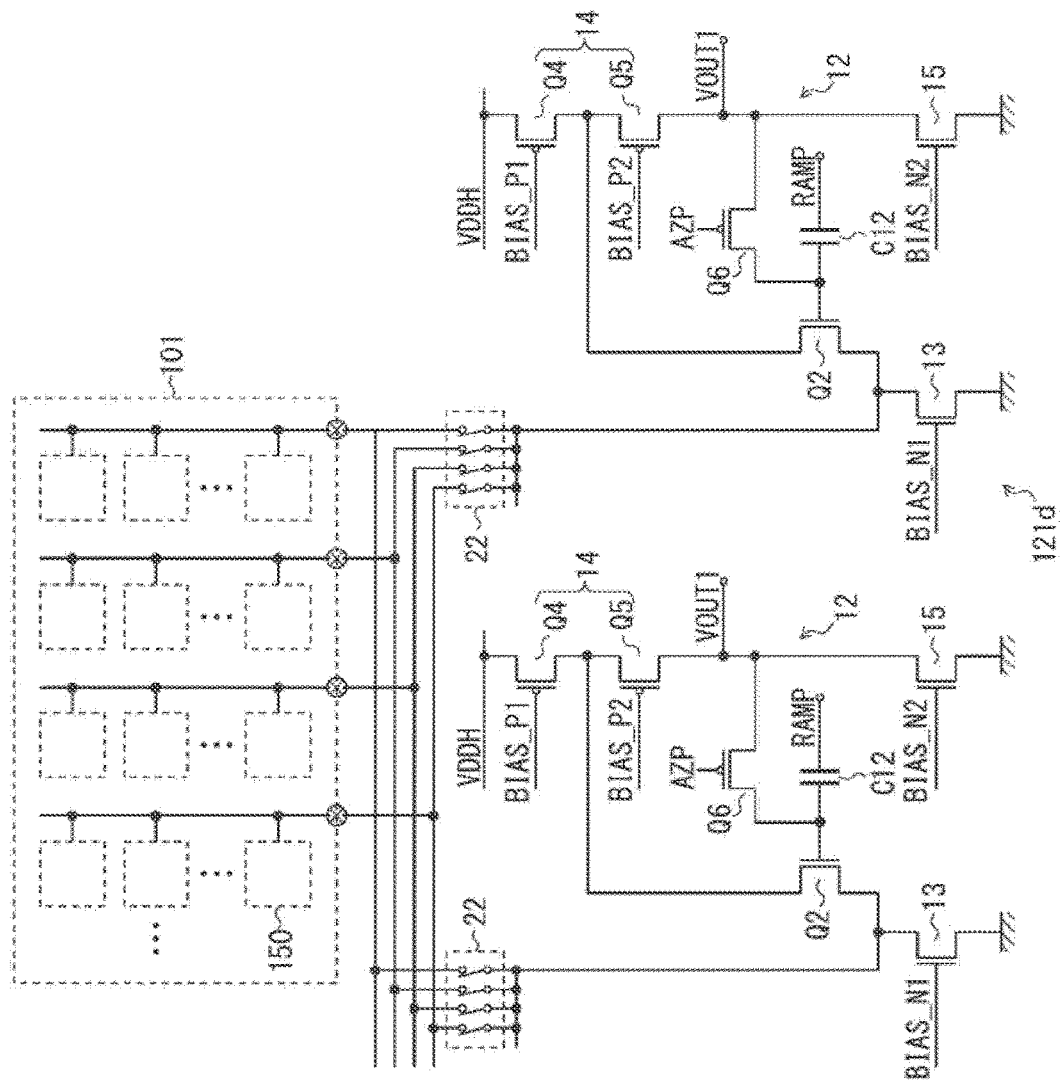
FIG. 11 is a circuit diagram of an imaging device including the comparator shown in FIG. 9.

FIG. 11 is a circuit diagram of an imaging device 100 including the comparators 121$d$ shown in FIG. 10. The imaging device 100 in FIG. 11 includes a smaller number of comparators 121$d$ than the number of pixel columns in the column direction. In the pixel unit 101, a plurality of pixel columns extending in the column direction is disposed in the row direction. Each comparator 121$d$ includes a selector (multiplexer) 22, and each selector 22 can select any one, or two or more pixel columns among the plurality of pixel columns arranged in the row direction. The photoelectric conversion signal in the pixel column selected by each selector 22 is compared with the reference signal in the corresponding comparator 121$d$.

With the imaging device 100 in FIG. 11, one or a plurality of pixel columns can be selected by each selector 22, and the types of the pixel columns to be selected by the selectors 22 can be set as appropriate for the respective selectors 22. With this arrangement, the target to be compared with the reference signal by the respective comparators 121$d$ can also vary with each comparator 121$d$.

(Stacked Chip)

Figure 12A:
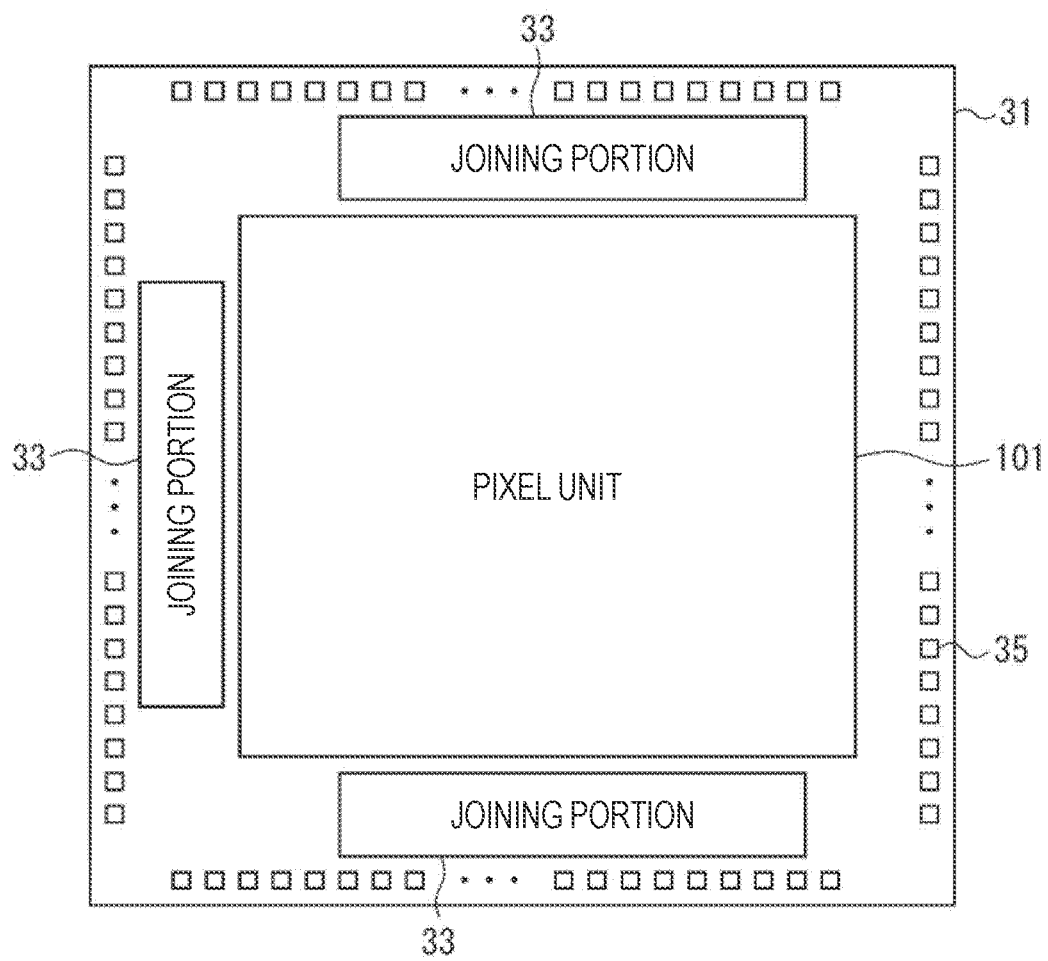
FIG. 12A is a layout diagram of a first substrate.
Figure 12B:
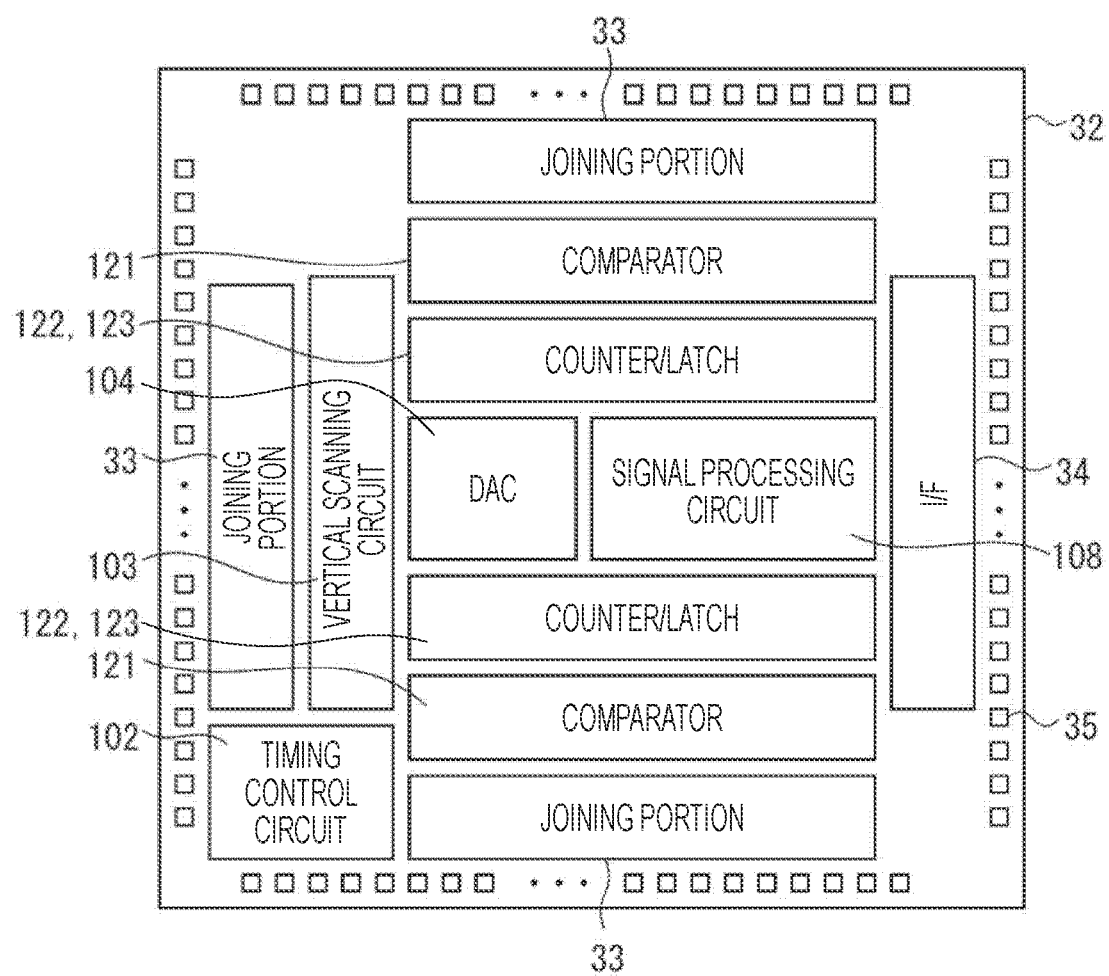
FIG. 12B is a layout diagram of a second substrate.

Each component in the imaging device 100 according to this embodiment can be disposed separately on a plurality of substrates, and these substrates may be stacked. FIG. 12A is a layout diagram of a first substrate 31, and FIG. 12B is a layout diagram of a second substrate 32. The first substrate 31 and the second substrate 32 are stacked to transmit and receive various kinds of signals with Cu—Cu joints, vias, bumps, conductive pads, or the like.

The first substrate 31 in FIG. 12A is disposed on the light incident side. In the first substrate 31, the pixel unit 101 and a plurality of joining portions 33 are disposed. In the joining portions 33, Cu—Cu joints, vias, bumps, or the like for transmitting and receiving various kinds of signals between the first substrate 31 and the second substrate 32 are disposed. The joining portions 33 are disposed around the pixel unit 101.

In the second substrate 32 in FIG. 12B, the timing control circuit 102, the vertical scanning circuit 103, the DAC 104, the ADCs 105, the horizontal transfer scanning circuit 106, the amplifier circuit 107, and the signal processing circuit 108 are disposed. The ADCs 105 include the comparators 121, the counters 122, and the latches 123. Also, an interface unit (I/F) 34 for outputting signals subjected to signal processing and inputting signals from the outside to each component in the second substrate 32 is disposed in the vicinity of the signal processing circuit 108.

Further, a plurality of pads 35 is arranged along the edges of the first substrate 31 and the second substrate 32. Bonding wires for connecting to the respective components in the respective substrates are connected to these pads 35.

The first transistor Q1 (the amplification transistor 154) and the third transistor Q3 (the select transistor 155) in the comparator 121 shown in FIG. 3 are disposed in the pixel unit 101 in the first substrate 31, and the other transistors are disposed in a dashed line portion in the second substrate 32.

Note that what components are disposed in the first substrate 31 and the second substrate 32 can be determined as appropriate, and at least one of the components other than the first transistor Q1 and the third transistor Q3 in the comparator 121 may be disposed in the first substrate 31.

(Effects to be Achieved by this Embodiment)

As described above, in the imaging device 100 according to this embodiment, the operating point of the differential circuit 11 is set within a signal reset period before an operation of comparing a photoelectric conversion signal with a reference signal is started, and the reference signal whose voltage level varies on the basis of the operating point is supplied to the differential circuit 11. More specifically, within the signal reset period, the gate of the second transistor Q2 to which the reference signal is supplied at the gate and the output node n1 of the comparator 121 are short-circuited, the voltage level of the output node is subjected to negative feedback control, and the bias signals BIAS_P1 and BIAS_P2 of the fourth transistor Q4 and the fifth transistor Q5 constituting the second current source 14 connected to the output node are adjusted and maintained. With this arrangement, when the photoelectric conversion operation is started later, the comparison operation by the comparators 121 can be performed without depending on the characteristics and the variation of the pixels 150, and degradation in quality of the captured image can be prevented.

Further, each comparator 121 outputs a signal corresponding to a difference between the current flowing in the amplification transistor 154 (the first transistor Q1) in the pixel 150 and the current flowing in the second transistor Q2 to which the reference signal is supplied at the gate. As a result, the comparison operation by the comparators 121 can be conducted at high speed, and photoelectric conversion signals can be read at high speed. In particular, in the imaging device 100 according to the present disclosure, the output of the source follower circuit in each pixel 150 is not input to the comparator 121, and the current flowing in the amplification transistor 154 (the first transistor Q1) is compared directly with the current flowing in the second transistor Q2. Thus, the problem in that the comparison operation cannot be performed until the output voltage of the source follower circuit is stabilized does not occur, and a high-speed operation can be performed. Furthermore, a conventional pixel 150 includes a current source connected to a source follower circuit. However, this current source is also unnecessary. Accordingly, the internal configuration of the imaging device 100 can be made simpler than that of a conventional imaging device, and downsizing and lower power consumption can be realized.

<Example Applications to Mobile Structures>

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

Figure 13:
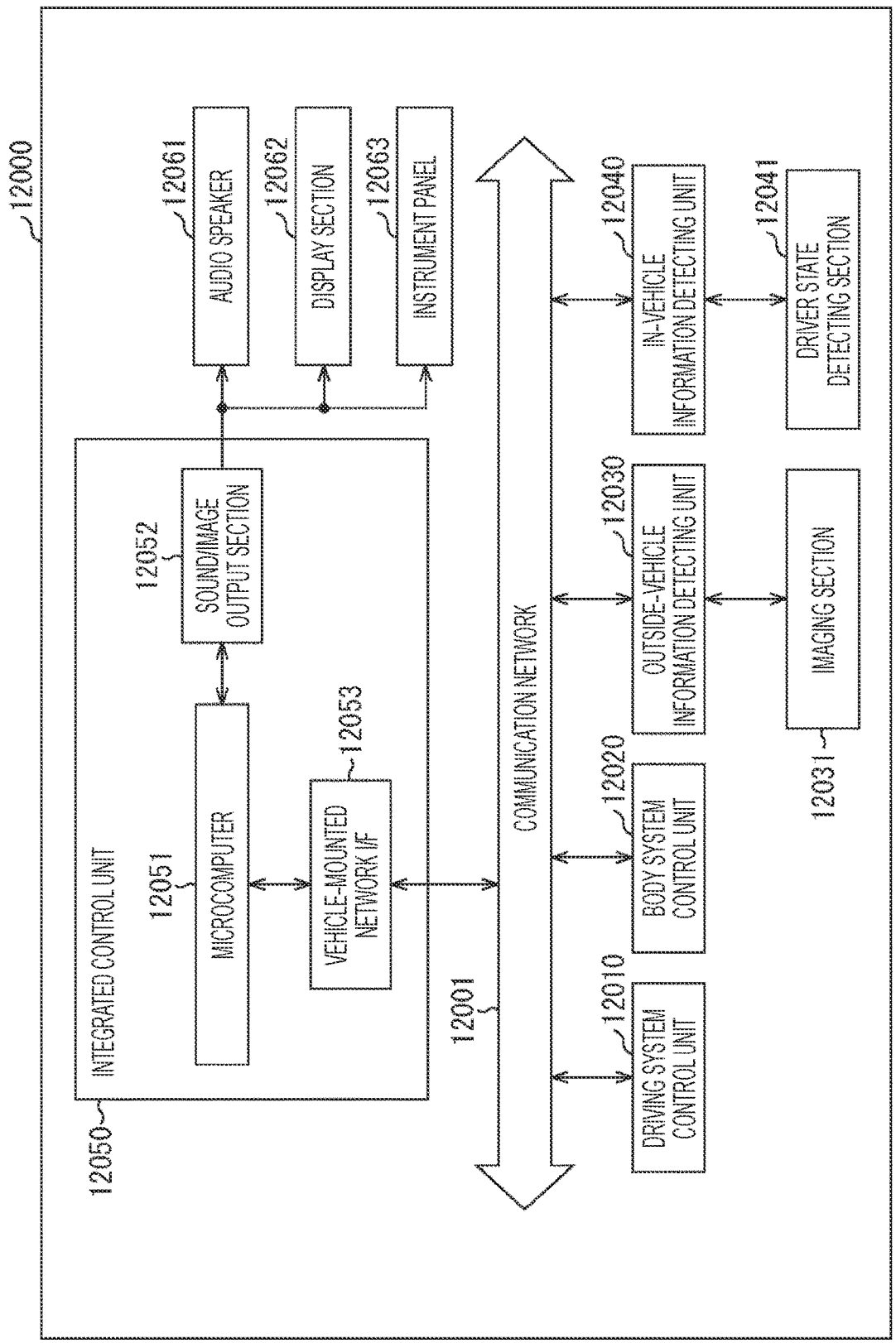
FIG. 13 is a block diagram showing an example of a schematic configuration of a vehicle control system that is an example of a mobile structure control system.

FIG. 13 is a block diagram showing an example of a schematic configuration of a vehicle control system as an example of a mobile structure control system to which the technology according to the present disclosure can be applied.

The vehicle control system 12000 includes a plurality of electronic control units connected to each other via a communication network 12001. In the example depicted in FIG. 13, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

The microcomputer 12051 can also output a control command to the body system control unit 12020 on the basis of information about the outside of the vehicle acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 13, an audio speaker 12061, a display section 12062, and an instrument panel 12063 are illustrated as the output device. The display section 12062 may, for example, include at least one of an on-board display and a head-up display.

Figure 14:
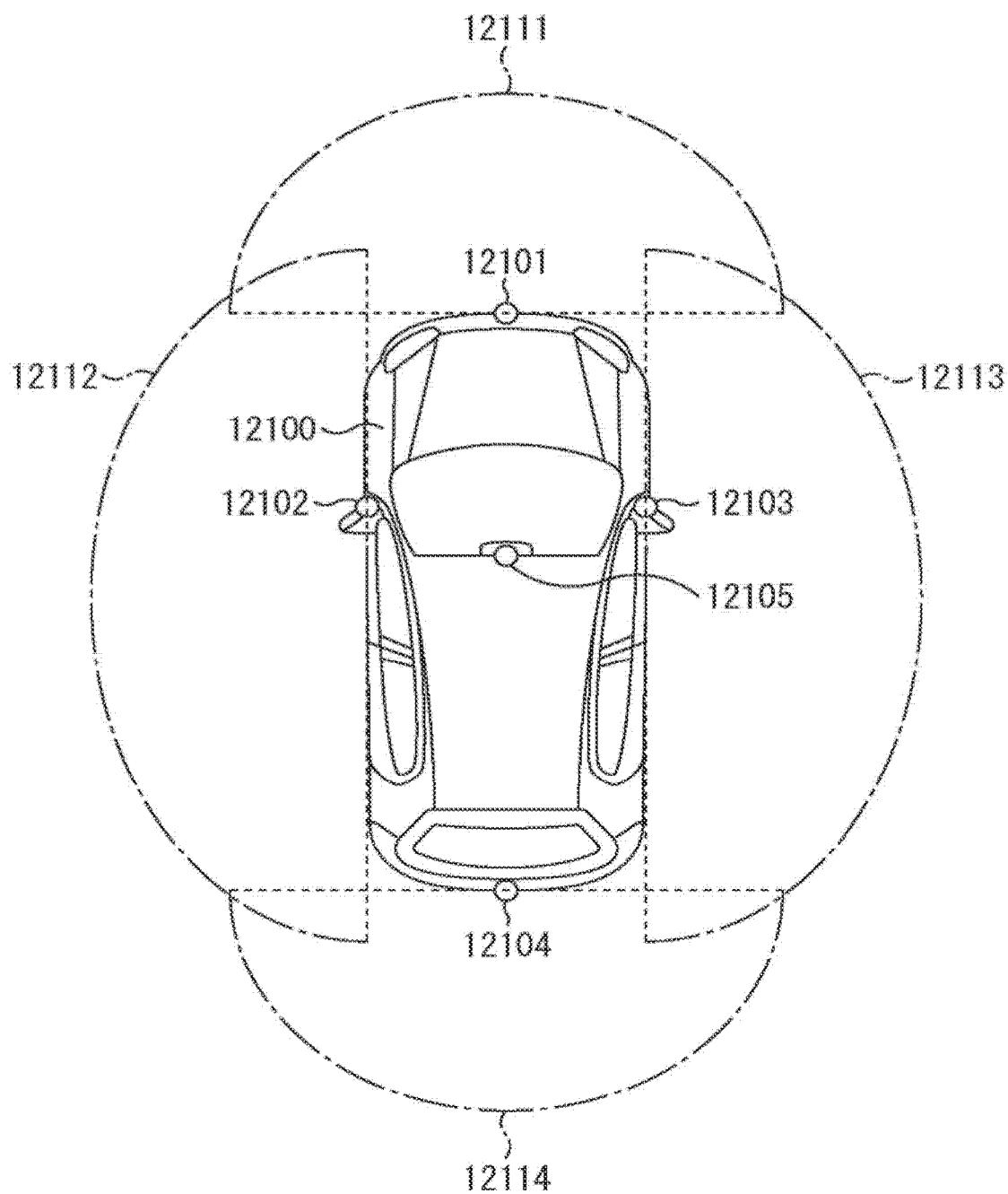
FIG. 14 is a diagram showing an example of the installation positions of imaging sections.

FIG. 14 is a diagram showing an example of the installation positions of the imaging sections 12031. In FIG. 14, the imaging sections 12031 include imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 14 shows an example of the imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera formed with a plurality of imaging elements, or may be an imaging element having pixels 150 for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described so far. The technology according to the present disclosure can be applied to the imaging sections 12031 in the configuration described above. As the technology according to the present disclosure is applied to the imaging sections 12031, display with excellent display quality can be achieved, and captured images that are easier to view can be obtained. Thus, fatigue of the driver can be reduced.

Note that the present technology can also be embodied in the configurations as described below.

(1) An imaging device including:
    a pixel that outputs a photoelectric conversion signal corresponding to an incident light quantity; and
    a comparator that compares the photoelectric conversion signal with a reference signal,
    in which
    the comparator includes:
    a differential circuit that outputs a signal corresponding to a signal difference between the photoelectric conversion signal and the reference signal; and
    a differential control circuit that sets an operating point of the differential circuit within a signal reset period before an operation of comparing the photoelectric conversion signal with the reference signal is started.

(2) The imaging device according to (1), in which
    the comparator includes a first current source connected to the differential circuit,
    the pixel includes a first transistor that generates a current corresponding to the photoelectric conversion signal,
    the differential circuit includes a second transistor that generates a current corresponding to the reference signal,
    the differential circuit outputs a signal corresponding to a difference between a current flowing in the first transistor and a current flowing in the second transistor, and the first current source generates and applies a current obtained by adding the current flowing in the first transistor and the current flowing in the second transistor.

(3) The imaging device according to (2), in which the differential circuit includes a third transistor that is cascode-connected to the first transistor, and is turned on when the pixel to be read is read, and the first current source generates and applies a current obtained by adding a current flowing in the first transistor and the third transistor, and the current flowing in the second transistor.

(4) The imaging device according to (2) or (3), in which the differential control circuit includes a second current source and a third current source that are connected in series between a first reference voltage node and a second reference voltage node, the second current source includes a fourth transistor and a fifth transistor that are cascode-connected between the first reference voltage node and an input node of the third current source, and a connection node between the fourth transistor and the fifth transistor is connected to the second transistor.

(5) The imaging device according to (4), in which the differential control circuit includes an output node that outputs the signal corresponding to the signal difference, from a connection node between the second current source and the third current source, and the differential control circuit performs negative feedback control on a voltage level of the output node within the signal reset period.

(6) The imaging device according to (5), in which the comparator includes a sixth transistor that switches whether or not to short-circuit a gate of the second transistor and the output node, and the sixth transistor is turned on within the signal reset period, to short-circuit the gate of the second transistor and the output node.

(7) The imaging device according to (6), further including a capacitor that is connected between the gate of the second transistor and an input node of the reference signal, in which the input node of the reference signal is set at a predetermined voltage level while the sixth transistor is on.

(8) The imaging device according to any one of (5) to (7), in which gate voltages of the fourth transistor and the fifth transistor are adjusted, to set the voltage level of the output node at a predetermined voltage level within the signal reset period.

(9) The imaging device according to (8), in which voltage levels of the gate voltages of the fourth transistor and the fifth transistor are maintained after the operating point is set.

(10) The imaging device according to (8) or (9), in which the gate voltages of the fourth transistor and the fifth transistor are set at a voltage level at which the fourth transistor and the fifth transistor operate in a saturated state.

(11) The imaging device according to any one of (8) to (10), in which each of the fourth transistor and the fifth transistor is a P-type MOS transistor, and a gate of the fifth transistor is set at a lower voltage level than a voltage level of a gate of the fourth transistor.

(12) The imaging device according to any one of (5) to (11), further including a seventh transistor and an eighth transistor that are cascode-connected between the first reference voltage node and the second reference voltage node, in which a predetermined bias signal is supplied to a gate of the seventh transistor, and the output node is connected to a gate of the eighth transistor.

(13) The imaging device according to any one of (5) to (11), further including a ninth transistor that is connected in parallel to the fourth transistor, and is cascode-connected to the second transistor.

(14) The imaging device according to (13), in which, when a gate voltage of the first transistor drops, a gate voltage of the ninth transistor is adjusted, to apply the same current as a current flowing before the drop in the gate voltage of the first transistor to the first current source.

(15) The imaging device according to any one of (5) to (14), further including a tenth transistor that is connected in parallel to the second transistor, in which the output node is connected to a gate of the tenth transistor.

(16) The imaging device according to any one of (2) to (15), in which the differential circuit compares a sum of currents flowing in a plurality of the first transistors provided in a plurality of the pixels with the current flowing in the second transistor, and outputs the signal corresponding to the signal difference.

(17) The imaging device according to any one of (2) to (15), further including a selector that selects at least one first transistor of a plurality of the first transistors provided in a plurality of the pixels, in which the differential circuit compares a sum of currents flowing in the at least one first transistor selected by the selector with the current flowing in the second transistor, and outputs the signal according to the signal difference.

(18) The imaging device according to (1), further including:
a first substrate in which a plurality of the pixels is disposed; and
a second substrate that is stacked on the first substrate, the comparator being disposed in the second substrate.

(19) An imaging device including:
a pixel including a photoelectric conversion element and an amplification transistor;
a differential circuit that is formed with the amplification transistor, a first transistor that receives a reference signal, and a first current source;
a second current source and a third current source that are connected in series between a first reference voltage node and a second reference voltage node; and
a second transistor disposed between the second current source and the third current source,
in which a node between the second current source and the second transistor is connected to the first transistor.

(20) An electronic apparatus including:
a solid-state imaging device that outputs an imaging pixel signal subjected to photoelectric conversion in a plurality of pixels; and
a signal processing device that performs signal processing on the basis of the imaging pixel signal,
in which
the solid-state imaging device includes a comparator that compares a photoelectric conversion signal with a reference signal, and the comparator includes:

a differential circuit that outputs a signal corresponding to a signal difference between the photoelectric conversion signal and the reference signal; and a differential control circuit that sets an operating point of the differential circuit within a signal reset period before an operation of comparing the photoelectric conversion signal with the reference signal is started.

The modes of the present disclosure are not limited to the respective embodiments described above, and include various modifications that could be conceived of by those skilled in the art. Further, the effects of the present disclosure are not limited to the effects described above. That is, various additions, modifications, and partial deletions are possible without departing from the conceptual idea and spirit of the present disclosure derived from the matters defined in the claims and equivalents thereof.

REFERENCE SIGNS LIST

11 Differential circuit
12 Differential control circuit
13 First current source
14 Second current source
15 Third current source
16 Differential amplifier
17 Current source
18 Current source
18 Constant current source
21 Output amplifier
22 Selector (multiplexer)
31 First substrate
32 Second substrate
33 joining portion
34 Interface unit (I/F)
35 Pad
100 Imaging device
Pixel unit
102 Timing control circuit
103 Vertical scanning circuit
105 ADC group
105 Analog-digital converter (group)
106 Horizontal transfer scanning circuit
107 Amplifier circuit
108 Signal processing circuit
109 Pixel drive line
110 Vertical signal line
111 Horizontal transfer line
121 Comparator
121-1 Comparator
121a Comparator
121b Comparator
121c Comparator
121d Comparator
121-n Comparator
121z Comparator
122 Counter
122-1 Counter
122-n Counter
123 Latch
123-1 Latch
123-n Latch
150 Pixel
151 Photodiode
152 Transfer transistor
154 Amplification transistor
155 Select transistor (third transistor Q3)
155 Select transistor
156 Reset transistor
157 Constant current source
12000 Vehicle control system
12001 Communication network
12010 Driving system control unit
12020 Body system control unit
12030 Outside-vehicle information detecting unit
12030 Body system control unit
12031 Imaging section
12040 In-vehicle information detecting unit
12041 Driver state detecting section
12050 Integrated control unit
12051 Microcomputer
12052 Sound/image output section
12061 Audio speaker
12062 Display section
12063 Instrument panel
12100 Vehicle
12101 Imaging section

The invention claimed is:

1. An imaging device comprising:

a pixel that outputs a photoelectric conversion signal corresponding to an incident light quantity; and a comparator that compares the photoelectric conversion signal with a reference signal, wherein the comparator includes:

a differential circuit that outputs a signal corresponding to a signal difference between the photoelectric conversion signal and the reference signal; and a differential control circuit that sets an operating point of the differential circuit within a signal reset period before an operation of comparing the photoelectric conversion signal with the reference signal is started.

2. The imaging device according to claim 1, wherein the comparator includes a first current source connected to the differential circuit, the pixel includes a first transistor that generates a current corresponding to the photoelectric conversion signal, the differential circuit includes a second transistor that generates a current corresponding to the reference signal, the differential circuit outputs a signal corresponding to a difference between a current flowing in the first transistor and a current flowing in the second transistor, and the first current source generates and applies a current obtained by adding the current flowing in the first transistor and the current flowing in the second transistor.

3. The imaging device according to claim 2, wherein the differential circuit includes a third transistor that is cascode-connected to the first transistor, and is turned on when the pixel to be read is read, and the first current source generates and applies a current obtained by adding a current flowing in the first transistor and the third transistor, and the current flowing in the second transistor.

4. The imaging device according to claim 2, wherein the differential control circuit includes a second current source and a third current source that are connected in series between a first reference voltage node and a second reference voltage node, the second current source includes a fourth transistor and a fifth transistor that are cascode-connected between the first reference voltage node and an input node of the third current source, and a connection node between the fourth transistor and the fifth transistor is connected to the second transistor.

5. The imaging device according to claim 4, wherein the differential control circuit includes an output node that outputs the signal corresponding to the signal difference, from a connection node between the second current source and the third current source, and the differential control circuit performs negative feedback control on a voltage level of the output node within the signal reset period.

6. The imaging device according to claim 5, wherein the comparator includes a sixth transistor that switches whether or not to short-circuit a gate of the second transistor and the output node, and the sixth transistor is turned on within the signal reset period, to short-circuit the gate of the second transistor and the output node.

7. The imaging device according to claim 6, further comprising a capacitor that is connected between the gate of the second transistor and an input node of the reference signal, wherein the input node of the reference signal is set at a predetermined voltage level while the sixth transistor is on.

8. The imaging device according to claim 5, wherein gate voltages of the fourth transistor and the fifth transistor are adjusted, to set the voltage level of the output node at a predetermined voltage level within the signal reset period.

9. The imaging device according to claim 8, wherein voltage levels of the gate voltages of the fourth transistor and the fifth transistor are maintained after the operating point is set.

10. The imaging device according to claim 8, wherein the gate voltages of the fourth transistor and the fifth transistor are set at a voltage level at which the fourth transistor and the fifth transistor operate in a saturated state.

11. The imaging device according to claim 8, wherein each of the fourth transistor and the fifth transistor is a P-type MOS transistor, and a gate of the fifth transistor is set at a lower voltage level than a voltage level of a gate of the fourth transistor.

12. The imaging device according to claim 5, further comprising a seventh transistor and an eighth transistor that are cascode-connected between the first reference voltage node and the second reference voltage node, wherein a predetermined bias signal is supplied to a gate of the seventh transistor, and the output node is connected to a gate of the eighth transistor.

13. The imaging device according to claim 5, further comprising a ninth transistor that is connected in parallel to the fourth transistor, and is cascode-connected to the second transistor.

14. The imaging device according to claim 13, wherein, when a gate voltage of the first transistor drops, a gate voltage of the ninth transistor is adjusted, to apply the same current as a current flowing before the drop in the gate voltage of the first transistor to the first current source.

15. The imaging device according to claim 5, further comprising a tenth transistor that is connected in parallel to the second transistor, wherein the output node is connected to a gate of the tenth transistor.

16. The imaging device according to claim 2, wherein the differential circuit compares a sum of currents flowing in a plurality of the first transistors provided in a plurality of the pixels with the current flowing in the second transistor, and outputs the signal corresponding to the signal difference.

17. The imaging device according to claim 2, further comprising a selector that selects at least one first transistor of a plurality of the first transistors provided in a plurality of the pixels, wherein the differential circuit compares a sum of currents flowing in the at least one first transistor selected by the selector with the current flowing in the second transistor, and outputs the signal according to the signal difference.

18. The imaging device according to claim 1, further comprising:

a first substrate in which a plurality of the pixels is disposed; and a second substrate that is stacked on the first substrate, the comparator being disposed in the second substrate.

19. An imaging device comprising:

a pixel including a photoelectric conversion element and an amplification transistor;

a differential circuit that is formed with the amplification transistor, a first transistor that receives a reference signal, and a first current source;

a second current source and a third current source that are connected in series between a first reference voltage node and a second reference voltage node; and a second transistor disposed between the second current source and the third current source, wherein a node between the second current source and the second transistor is connected to the first transistor.

20. An electronic apparatus comprising:

a solid-state imaging device that outputs an imaging pixel signal subjected to photoelectric conversion in a plurality of pixels; and a signal processing device that performs signal processing on a basis of the imaging pixel signal, wherein the solid-state imaging device includes a comparator that compares a photoelectric conversion signal with a reference signal, and the comparator includes:

a differential circuit that outputs a signal corresponding to a signal difference between the photoelectric conversion signal and the reference signal; and a differential control circuit that sets an operating point of the differential circuit within a signal reset period before an operation of comparing the photoelectric conversion signal with the reference signal is started.

* * * * *